US006303865B1

(12) United States Patent
Yamamoto et al.

(10) Patent No.: US 6,303,865 B1
(45) Date of Patent: Oct. 16, 2001

(54) WATERPROOF STRUCTURE FOR WIRE HARNESS

(75) Inventors: Takatatsu Yamamoto; Shigehiko Kobayashi; Tomohiro Ikeda, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 08/247,894

(22) Filed: May 23, 1994

(30) Foreign Application Priority Data

May 24, 1993 (JP) ........................................ P5-121167
Sep. 22, 1993 (JP) ........................................ P5-236867

(51) Int. Cl.[7] ........................................ H02G 1/14
(52) U.S. Cl. .................. 174/72 A; 174/17.08; 174/77 R; 174/88 R
(58) Field of Search ............................ 174/72 A, 84 R, 174/88 R, 76, 77 R, 22 R, 17.08, 92

(56) References Cited

U.S. PATENT DOCUMENTS

| | | | | |
|---|---|---|---|---|
| 3,410,950 | * | 11/1968 | Freudenberg | 174/88 R |
| 3,879,575 | * | 4/1975 | Dobbin et al. | 174/92 |
| 4,550,220 | * | 10/1985 | Kitchens | 174/92 X |
| 4,610,738 | * | 9/1986 | Jervis | 156/49 |
| 4,714,801 | * | 12/1987 | Koblitz et al. | 174/88 R |
| 4,718,678 | * | 1/1988 | Vansant | 174/77 R |
| 4,849,580 | * | 7/1989 | Reuter | 174/92 |
| 4,859,809 | * | 8/1989 | Jervis | 174/92 |
| 4,863,535 | * | 9/1989 | More | 156/49 |
| 4,963,700 | * | 10/1990 | Olsen et al. | 174/92 X |
| 5,021,611 | * | 6/1991 | Amano | 174/88 R |
| 5,099,088 | * | 3/1992 | Usami et al. | 174/76 |

FOREIGN PATENT DOCUMENTS

| | | |
|---|---|---|
| 1-206573 | 8/1989 | (JP) . |
| 4-41733 | 9/1992 | (JP) . |

* cited by examiner

*Primary Examiner*—Albert W. Paladini
(74) *Attorney, Agent, or Firm*—Blank Rome Comisky & McCauley, LLP

(57) ABSTRACT

A waterproof structure for a wire harness having at least one instrument, a plurality of electric wires connected thereto and a plurality of wire connecting parts at which the electrical wires are bundled. The waterproof structure includes a sealant having a viscidity less than 40000 CPS. The sealant is retained by the wire connecting part arranged in the nearest position to the instrument positioned at a tail end in an intruding course of water into the wire harness. Due to its low viscidity, the sealant can be brought easiliy among core lines constituting the wire, whereby gaps among the core lines can be sealed perfectly. Therefore, even if the water intrudes along the core lines through the other wire connecting parts, the flow of water can be checked at the specified wire connecting part thereby to protect the instrument from the immersion of water.

9 Claims, 5 Drawing Sheets

WATERPROOF STRUCTURE FOR WIRE HARNESS

BACKGROUND OF THE INVENTION

This invention relates to a waterproof structure for a wire harness equipped in a vehicle such as an automobile.

In general, a connector in the wire harness, which is arranged outside of an interior of the vehicle, is constructed to have a waterproof structure in order not to cause leakage and corrosion due to immersion in water. However, in such a waterproof connector of a leak-tight structure, there is generated a phenomenon that, because of a pumping action caused by the change in temperature, water is sucked up via clearances between the electric wires of the wire connecting part of a connector thereby to immerse the interior thereof. Alternatively, there is the other phenomenon that since the water is sucked up by capillary action in the gaps between the wires, the connector then becomes immersed by the water.

In order to prevent the water from intruding through the wire connecting part, Japanese Unexamined Patent Publication (Kokai) No. 1-206573 and Japanese Examined Utility Model Publication (Kokoku) No. 4-41733 disclose waterproof joint structures in which the wire connecting parts of the connectors are covered with butyl rubber.

In the conventional waterproof joint structure, in an assembled state, the wire connecting part and the wires (part) are enclosed by a butyl rubber (sticky sealant), which is arranged inside an insulator sheet of chlorine vinyl, and then pressed from outside, whereby the waterproof joint can be provided. In this structure, the butyl rubber fills gaps between the wires thereby to prevent the water from intruding from outside.

However, in such a wire harness where some wire connecting parts are provided on the wires to a connector, if the conventional waterproof joint is attached only to the nearest wire connecting part to the connector and no joints are attached to the other parts, the following problems are raised.

That is, in the conventional waterproof joint, although the exterior of the joint is only covered with the butyl rubber and thus gaps between the wires are closed, gaps among core lines accomodated in an outer shell of the wire cannot be sealed yet. Consequently, although the conventional joint can prevent the water from intruding from outside, it is impossible to stop the flow of water which enters through the other wire connecting parts and then/flows between the core lines.

Although it is necessary to provide all wire connecting parts with the waterproof joint in order to intercept the immersion of water, such an arrangement incures the increasing cost and time to build up the arrangement.

SUMMARY OF THE INVENTION

It is an object of the present invention to provide a waterproof structure for a wire harness capable of effecting its sealing ability without increasing the cost and time to build up it.

In order to achieve the above-mentioned object, the present invention provides a waterproof structure for a wire harness having at least one instrument, a plurality of electric wires connected thereto and a plurality of wire connecting parts at which the electrical wires are bundled, comprising:

a sealant retained by a specified wire connecting part of the wire connecting parts, the sealant having a viscidity less than 40000 CPS centipoise, and the specified wire connecting part being arranged in the nearest position to an instrument positioned at a tail end of an intruding course of water to the instrument.

According to the above-mentioned waterproof structure, since the sealant, which has a viscidity less than 40000 CPS, is retained in the nearest specified wire connecting part to the instrument such as a connector, the sealant can be brought among core lines constituting the electric wire, so that gaps among the core lines can be sealed perfectly. Therefore, even if the water intrudes along the core lines through the other wire connecting parts, the flow of water can be checked at the specified wire connecting part whereby the instrument such as the connector can be protected from the intrusion of water.

In the present invention, preferably, the specified wire connecting part is immersed in the sealant which is contained in a packing member accommodated in a waterproof case. Consequently, it is possible to provide the sealant among the core lines certainly. Note, in case of using grease as the sealant, it is possible to prevent the sealant from dispersing outwardly. Further, if only taping the whole waterproof case, it is possible to prevent the sealant from leaking certainly.

Furthermore, preferably, the sealant is coloured. In such a case, it is possible to confirm whether the sealant is applied on the specified wire connecting part certainly or whether the sealant is supplied into gaps among the core lines by capillarity. That is, in case of confirmation by operator's eyes, if by only looking at the apearance of the core lines, it is possible to find a spot where the operator forgot to apply the sealant thereon easily. Alternatively, when the confirmation is automated, it is possible to find the spot by means of a colour detecting sensor easily.

In the present invention, the Shore hardness of the sealant after solidification is preferably less than a value of 50 in the Shore hardness standard D-scale. With such an arrangement, when the wire harness is bent, the specified wire connecting part can follow the bending of the wire harness sufficiently, whereby removal and destruction of the sealant can be avoided.

According to the present invention, there is also provided a waterproof structure for a wire harness having at least one instrument, a plurality of electric wires connected thereto and a plurality of wire connecting parts at which the electrical wires are bundled, comprising:

- a waterproof case arranged in the nearest wire connecting part to an instrument positioned at a tail end of an intruding course of water into the wire harness, the waterproof case comprising:
  - a pail-like case body;
  - a pair of partitions facing each other at a distance along a longitudinal direction of the case body thereby to define a chamber for accommodating the connecting part therein, each of the partitions having a cut-out arranged on an upper end thereof to support a part of the electric wire in the vicinity of the wire connecting part;
  - a packing member arranged in the chamber to contain a sealant;
  - a cover connected with the case body to close an upper opening of the case body; and
  - a projection arranged on an inner surface of the cover, the projections intruding into the packing member when the cover closes the case body;
  - wherein the wire connecting part of the wire harness is mounted on the packing member in the chamber and the cover is locked against the case body in a condition under which the part of the electric wire in the vicinity of the wire connecting part passes through the cut-outs, whereby the wire connecting part is pressed into the packing member by the projection and thus immersed in the sealant contained in the packing member. With the above-mentioned arrangement, if only putting the wire connecting part in the waterproof case and then locking the cover against the pail-like case body, it is possible to immerse the wire connecting part in the sealant easily. Consequently, the sealing operation can be simplified while providing the certain sealing structure.

These and other objects and features of the present invention will become more fully apparent from the following description and appended claims taken in conjunction with the accompanying drawings.

DESCRIPTION OF THE PREFERRED EMBODIMENT

An embodiment of the present invention is now described with reference to the drawings.

Figure 1:
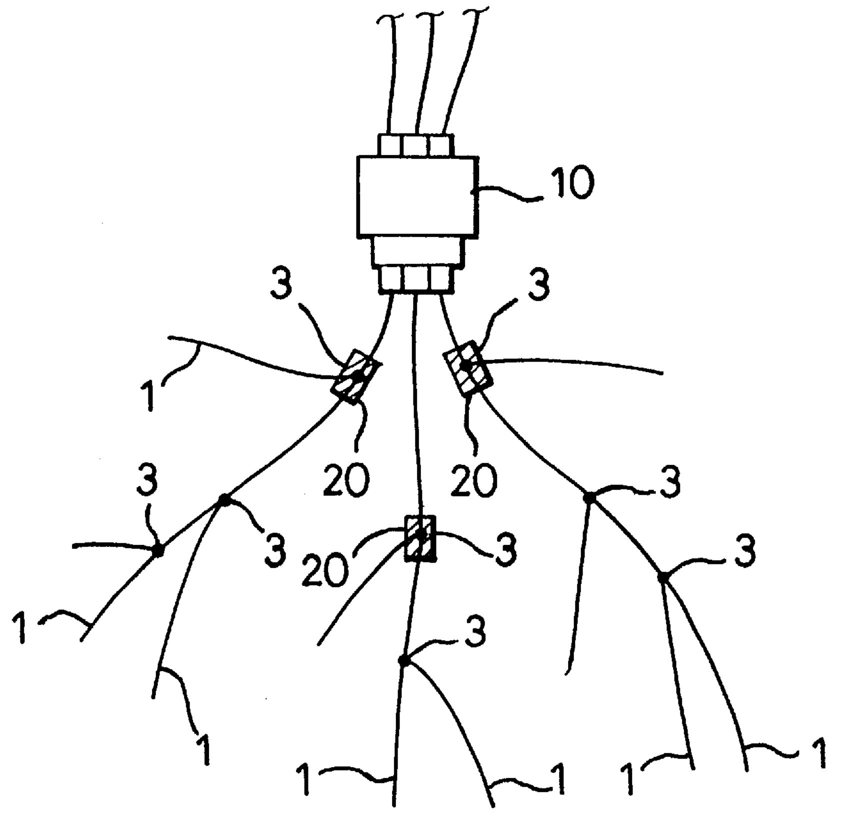
FIG. 1 shows a whole waterproof structure for a wire harness according to an embodiment of the present invention.

FIGS. 1 show a wire wire assertion and harness equipped with a waterproof structure according to an embodiment of the present invention. The wire harness includes a plurality of electric wire systems (3 systems shown in FIG. 1) connected with a connector 10 as an electric instrument. Each of the electric wire systems is provided with a plurality of wire connecting parts 3 at which electrical wires 1 are bundled. In each electric wire system, the nearest wire connecting part 3 to the connector 10 is provided with a waterproof joint 20. According to the embodiment, the waterproof joint 20 is provided by applying an adhesive agent on the nearest wire connecting part 3 and then winding a tape over the solidified adhesive agent. Note, In the embodiment, the adhesive agent has a viscidity less than 40000 CPS. By way of example of the adhesive agent, a coloured "Aron Alpha" (trademark name of merchandise; Manufactured by Toa Gosei Chemical Co., Ltd.; produce number #911P2, #911P3, viscidity: 10CPS) is used, having a minimum viscidity value specified as 2 CP. Additionally, after solidification, the adhesive agent has a hardness less than 50 (D-scale) in the Shore hardness standard.

Figure 2:
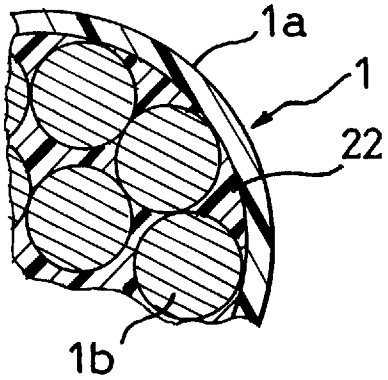
FIG. 2 is a sectional view showing an electric wire in the vicinity of a wire connecting part of the waterproof structure according to the embodiment of the present invention.
Figure 3:
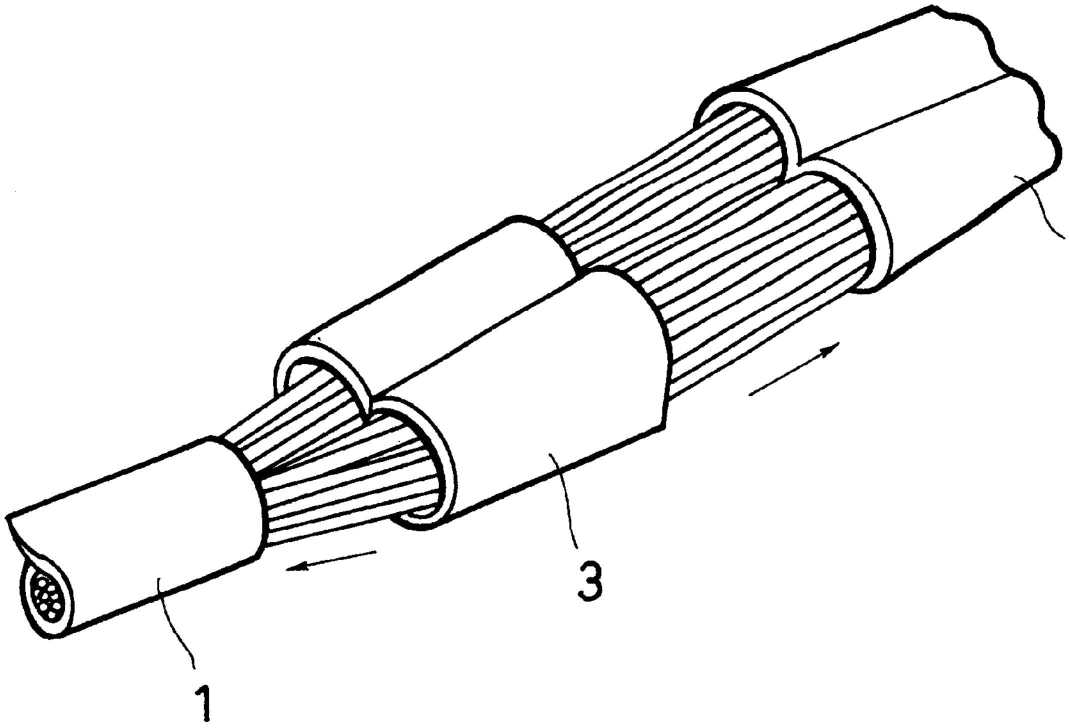
FIG. 3 is a perspective view showing the wire connecting part of the waterproof structure according to the embodiment of the present invention.

Due to its low viscidity and capillarity, the adhesive agent permeates among core lines (individual conductors) of the wire connecting parts 3 and among core lines constituting the wire or able (part) 1 in the vicinity of the wire connecting parts 3, so that it solidifies. That is, the core lines can comprise the individual strands of a stranded conductor or the individual conductors of a cable FIG. 2 shows a cross section of the wire 1 in the vicinity of the wire connecting part 3. As shown in the figure, the adhesive agent 22 can permeate into gaps or interstices among the core lines 1*b* (also gaps between the core lines 1*b* and an outer shell 1*a*). The adhesive agent 22 solidifies in a condition under which all of the above interstitial gaps are sealed. Arrows in FIG. 3 exhibit flowing directions of the adhesive agent 22 after it is applied on the wire 1 and the core lines 1*b*.

As described above, since the gaps among the core lines 1*b* are enclosed by the adhesive agent 22, it is possible to avoid the intrusion of water from the outside into the waterproof joint 20 having the adhesive agent 22 applied thereon. Again, since the gaps among the core lines 1*b* are sealed perfectly, either the capillarity or the suction of water through the other wire connecting parts 3 is no longer caused. Consequently, it is possible to prevent the water from intruding into the connector 10.

Additionally, due to the coloured adhesive agent, it is easily possible to confirm whether it is applied on the wire connecting part 3 by simple visual inspection, whereby there is no possibility of forgetting to apply the adhesive agent. Therefore, the omission of or improper performance of the sealing operation, which is derived from the operational difference among the operators, can be reduced thereby to improve the reliability of the sealing operation and the quality of the completed waterproof structure.

Figure 4:
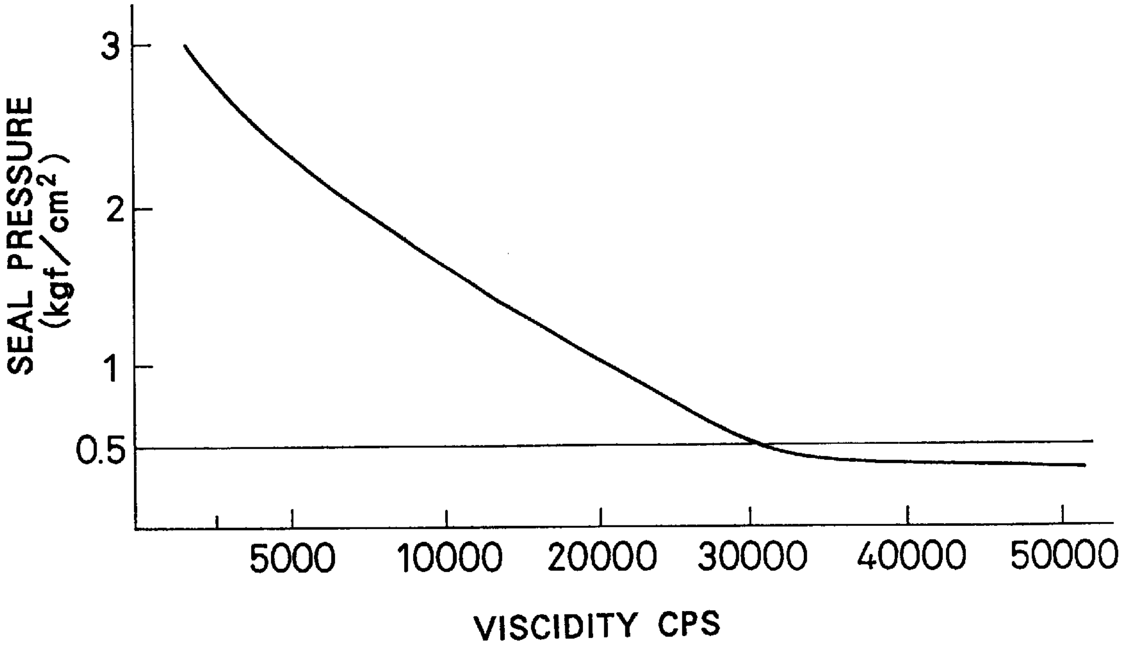
FIG. 4 is a diagram showing a relationship between viscidity of an adhesive agent and a sealing pressure to clarify the effect of the waterproof structure of the embodiment of the present invention.
Figure 5:
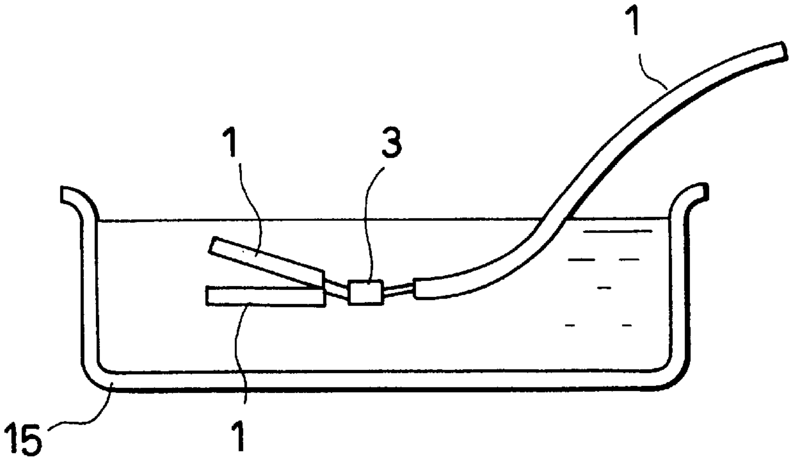
FIG. 5 is a schematic view showing how to examine the sealing pressure of the waterproof structure according to the embodiment of the present invention.

FIG. 4 shows a relationship between the viscidity of the adhesive agent and a sealing pressure. The relationship is understood by an examination of FIG. 5. In this examination, at first, the wire connecting part 3 to which a waterproof treatment is applied is immersed into a water bath and then, by introducing air into the part 3 through the wire 1, it is examined whether air bubbles are produced from the part 3 and the respective tip ends of the wire 1. In this way, the sealing pressure, at which the bubbles begin to be generated, can be detected. According to the result of this examination, it will be understood that, in order to maintain a sealing pressure of more than about 0.5 (kgf/cm2) as a standard pressure, it is preferable to use the adhesive agent having a viscidity less than 40000 CPS (and preferably, less than 30000 CPS)

Figure 6:
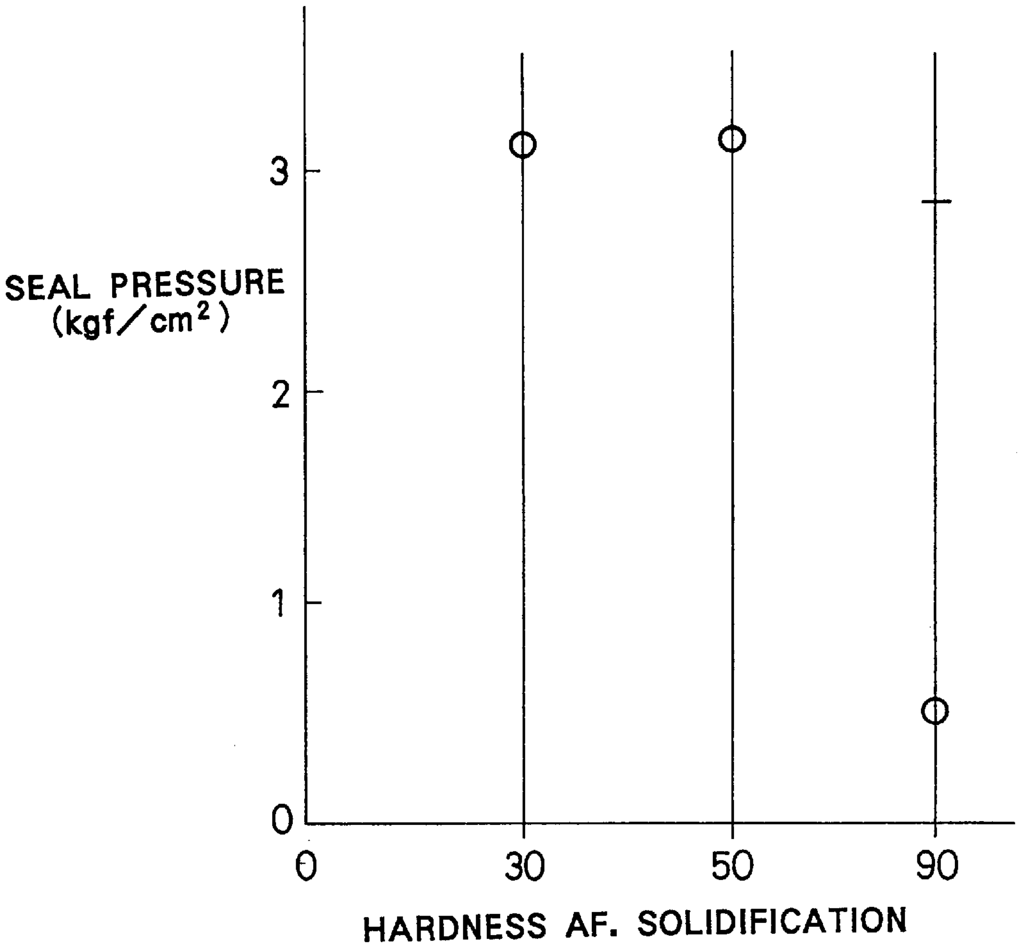
FIG. 6 is a diagram showing a relationship between the hardness after solidification and the sealing pressure to clarify the effect of the waterproof structure of the embodiment of the present invention.
Figure 7:
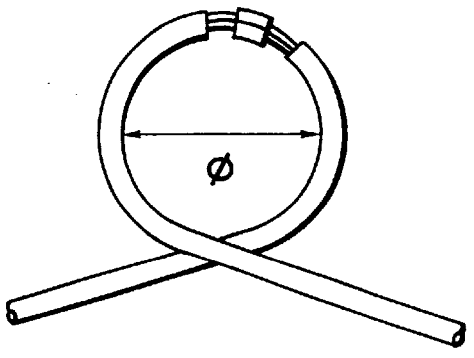
FIG. 7 is a schematic view showing how to make a speciman to measure the relationship between the hardness after solidification and the sealing pressure.

FIG. 6 shows a relationship between a hardness of the adhesive agent after solidification and the sealing pressure. The relationship is obtained by examination and measuring the sealing pressure by the above-mentioned method after bending the wire connecting part in a loop as shown in FIG. 7. In the examination, after the wire having the wire connecting part 3 was wound around a column of 50.8 in diameter with 5 windings, it then was further wound thereon with 5 more windings. Next, under such a condition, proof tests against the heat and cold and a thermal shock test were carried out. Then the sealing pressure was detected by the method shown in FIG. 5. Consequently, it is founded according to FIG. 6, that if the hardness of the adhesive agent is more than 50 in the Shore hardness standard, the deviation in the sealing pressure will be increased and that, if not, the sealing pressure exhibits a constant value, conversely. In conclusion, it is found that a constant sealing pressure can be obtained in such a adhesive agent as to have a hardness less than 50 (D-scale) in the Shore hardness standard, even if the adhesive agent is deformed following the bending of the wire harness.

Note that in the embodiment, sealant such as grease may be available instead of the adhesive agent 22. In such a case, it is preferable to retain the wire connecting part in a waterproof case in order to prevent the sealant from dispersing outwardly. In such a case, if a packing member (for example, a sponge or the equivalent) containing the sealant therein is employed in such a manner that it is accommodated in the waterproof case and then the wire connecting part is immersed thereinto, the immersion function would be more strongly effected. In case of providing the waterproof case, it is more preferable to tape the outside thereof. To the contrary, in case of not providing such a waterproof case, the butyl-rubber may be wound around the sealant and then it may be taped furthermore.

Further, the colouring of adhesive agent may be to correspond to the respective wire connecting parts. In the case, it is possible to use the appropriate adhesive agent color corresponding to each requirement desired for the individual wire connecting part, whereby reduction of cost of adhesive agent can be accomplished.

Figure 8:
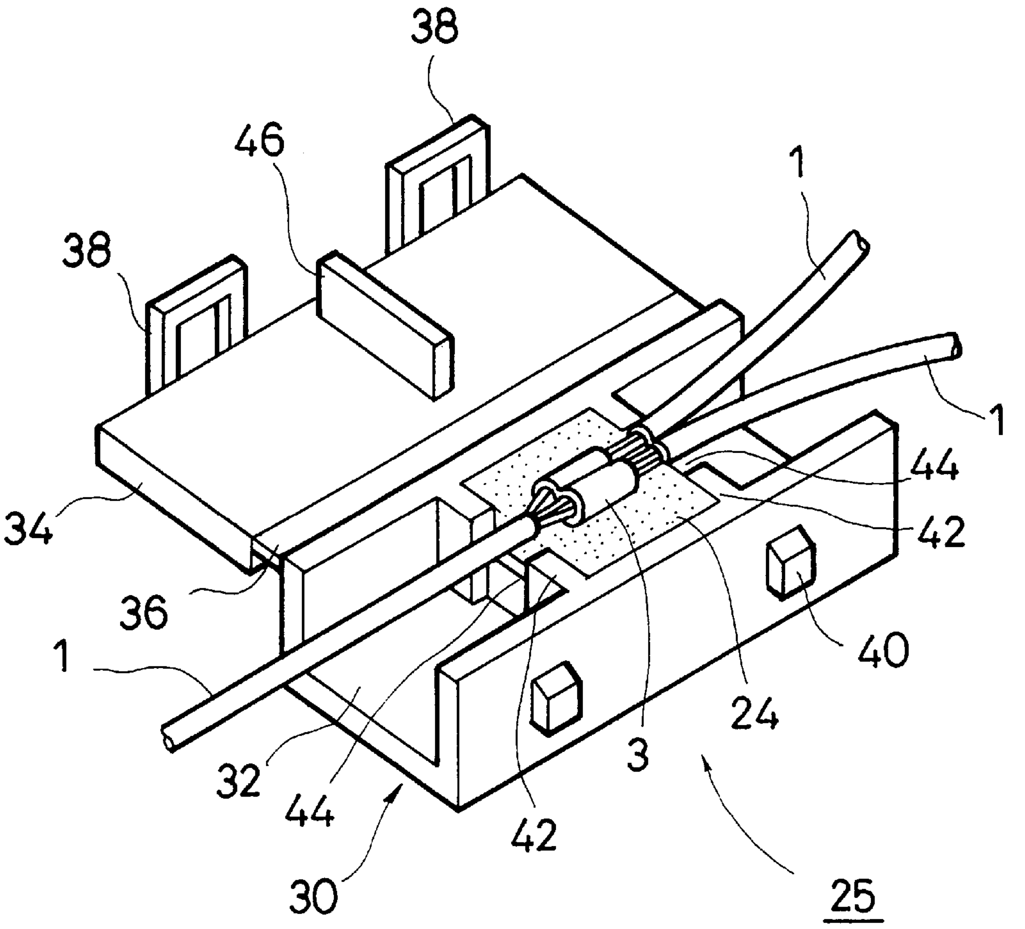
FIG. 8 is a perspective view showing the waterproof structure according to another embodiment of the present invention.
Figure 9:
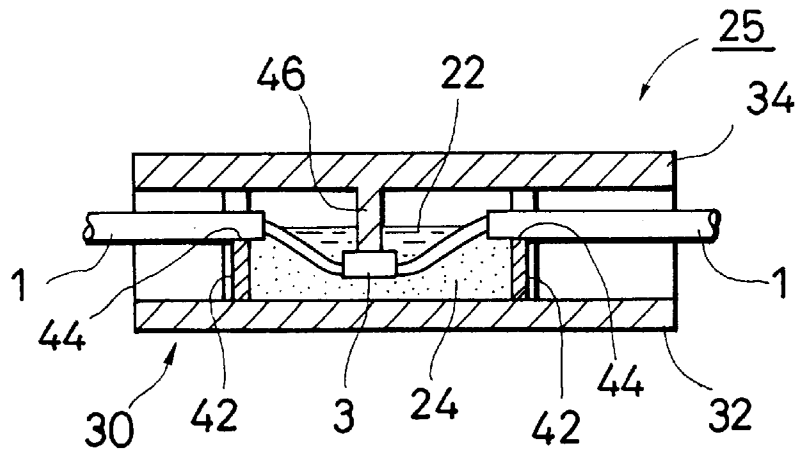
FIG. 9 is a side view of showing the waterproof structure of FIG. 8.

Next, a further embodiment will be described below with reference to FIGS. 8 and 9.

Also in this embodiment, a waterproof joint 25 is arranged at the nearest wire connecting part 3 to the connector (not shown). The waterproof joint 25 includes a waterproof case 30. The case 30 comprises a pail-like case body 32 and a plate-like cover 34 for closing an upper opening of the case body 32. The cover 34 is connected to an upper edge of an case body 32 through the intermediary hinge 36 thereby to open and close the body 32. In a state of closing the opening of the case 30, the cover 34 is locked against the case body 32 by means of female locking members 38 and male locking members 40.

Arranged inside the case body 32 and in a substantially intermediate position along a longitudinal direction thereof are a pair of partitions 42 which face each other at a distance along the longitudinal direction thereof. Between the partitions 42, there is defined a chamber for accommodating the wire connecting part 3, in which a packing member 24 is accommodated containing the adhesive agent (sealant) 22 having a viscidity less than 40000 CPS. Each of the partitions 42 is provided with a cut-out 44 to pass a part of the wire 1 in the vicinity of the wire connecting part 3 therethrough. The cover 34 is provided on an inner surface thereof with a projection 46 which intrudes inside the packing member 24 when the cover 34 is locked against the case body 32.

In operation, since the wire connecting part 3 is mounted on the packing member 24 in the so-constructed waterproof case 30 and then the cover 34 is locked against the case body 32 while the part of wire 1 in the vicinity of the wire connecting part 3 passes through the cut-outs 44 of the partitions 42, the wire connecting part 3 is pressed into the packing member 24 by the projection 46, whereby the adhesive agent 22 breaks out exudes from, the packing member 24 and thus the wire connecting part 3 is immersed in the adhesive agent 22.

According to the embodiment, the waterproof joint 25 can be easily provided if one only puts the wire connecting part 3 in the waterproof case 3 and then locks the cover 34 thereto. Therefore, in this embodiment, the sealing operation by the operator can be simplified while maintaing the waterproof funtion similarly as that of the previous embodiment. Note that, although the adhesive agent is applied on a so-called joint terminal in this embodiment, the agent can be applicable to a not-shown LA eyelet as a modification thereof.

As mentioned above, according to the present invention, since sealant having a low viscidity is retained in the wire connecting part at the tail end in the immersion course of the water, it is possible to seal the interstitial gaps among the core lines with the sealant. Even if the water intrudes along the core lines through the other wire connecting parts, the flow of water is checked at the specified wire connecting part. Therefore, it is necessary to provide the waterproof joint to the other wire connceting parts, whereby it is possible to reduce the cost and time to build up the waterproof structure.

Furthermore, in the other form of the invention, since the wire connecting part is accommodated in the waterproof case, the structure is suitable to use the grease as the sealant.

Further, according to the modification of the invention, since the sealant is coloured, it is possible to confirm easily whether the sealant is applied on the specified wire connecting part or not.

According to the other embodiment in which the hardness of sealant after solidification is less than 50 in “DD” scale of the Shore hardness standard, when the wire harness is bent, the wire connecting part can follow the bending of the wire harness sufficiently, whereby a removal and destruction of the sealant can be avoided.

Furthermore, the sealing effect may be effectuated by using a grease material as the sealant, wherein the wire connceting part is to be immersed in the grease sealant.

Finally, it will be understood by those skilled in the art that the forgoing description of the preferred embodiments of the disclosed structure, and that various changes and modifications may be made to the present invention without departing from the spirit and scope thereof.

What is claimed is:

1. A system for a waterproof wire harness structure, comprising:

a) at least one instrument;

b) a plurality of electric wires connected to the instrument;

c) a plurality of wire connecting parts at which the electrical wires are bundled; and d) a sealant retained by a specified wire connecting part of said wire connecting parts, said sealant having a viscidity less than about 40000 CPS and a hardness after solidification of less than about 50 on the Shore-D scale;

wherein the specified wire connecting part is arranged in a position nearest to the instrument positioned at a tail end of an intruding course of water into said harness.

2. The system of claim 1, further including a porous packing member housed in a waterproof case, wherein said specified wire connecting part is immersed in said sealant and wherein said sealant is contained in the porous packing member.

3. The system of claim 1, wherein one of a plurality of differently colored sealants are employed as said sealant, each colored sealant being associated with a coded meaning different from the coded meaning of other sealants.

4. The system of claim 1, wherein said sealant is characterized after solidification by a D-scale Shore hardness of less than about 50.

5. A system for a waterproof wire harness structure, comprising:

a) at least one instrument;

b) a plurality of electric wires connected to the instrument;

c) a plurality of wire connecting parts at which the electrical wires are bundled;

d) a waterproof case for enclosing a wire connecting part subject to an intruding course of water into said harness, said waterproof case further comprising:

i) first and second pairs of confronting wall surfaces and a bottom wall surface joining said confronting wall surfaces to form a recess, wherein said first pair of wall surfaces have a longitudinal axis extending parallel thereto and therebetween;

ii) a pair of parallel partitions spaced apart along the longitudinal axis, thereby defining therebetween a space adapted for accommodating one of said connecting parts therein, wherein each of said partitions has a notched cut-out at an upper end thereof and is adapted to receive and support said electric wire near said wire connecting part;

iii) a cover connected with said case body to close an upper opening of said case body; and iv) a projection on an inner surface of said cover;

e) a porous packing member disposed within said recess; and f) a sealant having a viscidity less than about 40000 CPS contained within said packing member and a hardness after solidification of less than about 50 on the Shore D-scale;

wherein said projection intrudes toward said packing member when said cover closes said case body, said wire connecting part of the wire harness is positioned on said packing member in said recess, and said cover is locked against said case body such that said electric wire part in the vicinity of said wire connecting part passes through said notch cut-outs, whereby said projecting member presses said wire connecting part into said packing member sufficient to force sealant from said packing member such that said wire connecting part becomes immersed in said sealant exuded from said packing member.

6. The system of claim 5, wherein said sealant has a viscidity less than about 30000 CPS.

7. The system of claim 5, wherein one of a plurality of differently colored sealants are employed as said sealant, each colored sealant being associated with a coded meaning different from the coded meaning of other sealants.

8. The system of claim 5, wherein said sealant has a viscidity less than about 30000 CPS and is characterized after solidification by a D-scale Shore hardness of less than about 50.

9. A system for a waterproof wire harness structure, comprising:

a) at least one instrument;

b) a plurality of electric wires connected to the instrument;

c) a plurality of wire connecting parts at which the electrical wires are bundled; and d) an at least partially solidifiable sealant retained by a specified wire connecting part of said wire connecting parts, wherein the specified wire connecting part is arranged adjacent to an instrument and positioned so that water traveling along and within said electric wires will not enter said instrument, and wherein said sealant is characterized by a viscidity upon application of less than about 40,000 CPS and after solidification by a D-scale Shore hardness of less than about 50.

* * * * *